United States Patent [19]

Ojanen

[11] Patent Number: 5,251,964
[45] Date of Patent: Oct. 12, 1993

[54] CUTTING BIT MOUNT HAVING CARBIDE INSERTS AND METHOD FOR MOUNTING THE SAME

[75] Inventor: Randall W. Ojanen, Bristol, Tenn.

[73] Assignee: GTE Valenite Corporation, Troy, Mich.

[21] Appl. No.: 923,641

[22] Filed: Aug. 3, 1992

[51] Int. Cl.⁵ .................... E21B 10/56; B23K 31/02
[52] U.S. Cl. .............................. 299/91; 175/435; 228/255
[58] Field of Search .................... 299/79, 86, 91; 175/425, 427, 428, 432, 435; 76/101.1; 228/122, 134, 255

[56] References Cited

U.S. PATENT DOCUMENTS

| | | | |
|---|---|---|---|
| 3,397,013 | 8/1968 | Krekler | 299/86 |
| 3,512,838 | 5/1970 | Kniff | 299/86 |
| 4,453,605 | 6/1984 | Short, Jr. | 228/255 X |
| 4,877,096 | 10/1989 | Tibbitts | 175/432 |
| 4,932,723 | 6/1990 | Mills | 299/86 |
| 5,201,569 | 4/1993 | Jadke | 299/86 |

Primary Examiner—David J. Bagnell
Attorney, Agent, or Firm—Bill C. Panagos

[57] ABSTRACT

The forward surface of a bit mount against which the shoulder of a cutting bit can rotatably bear has carbide inserts brazed therein to reduce wear of the forward surface. In the manufacture thereof, there are insert holes in the forward surface into which the carbide inserts are inserted. There are smaller holes next to the insert holes, and overlapping therewith, into which braze slugs are inserted. There is an interference fit between the carbide inserts and the braze slugs, which aids in retaining the carbide inserts in the insert holes during the brazing operation.

7 Claims, 1 Drawing Sheet

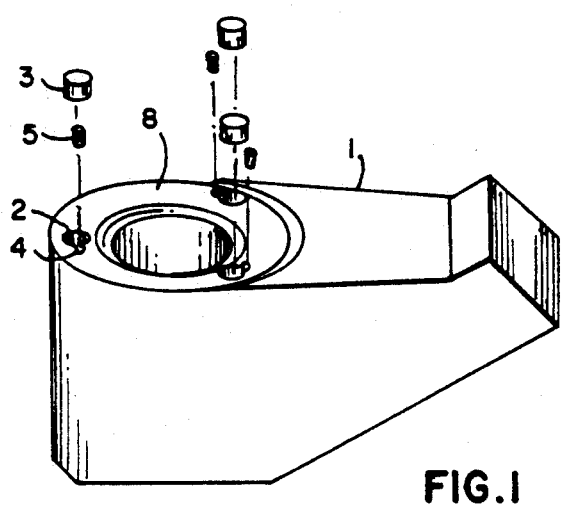
FIG. 1
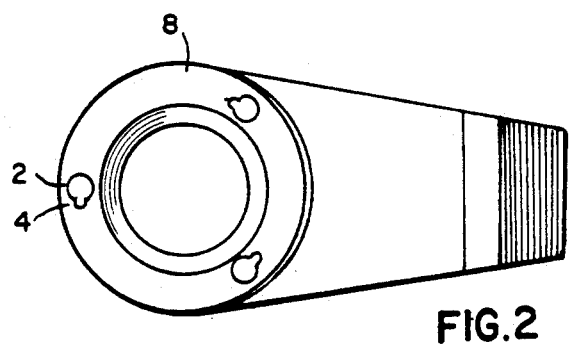
FIG. 2
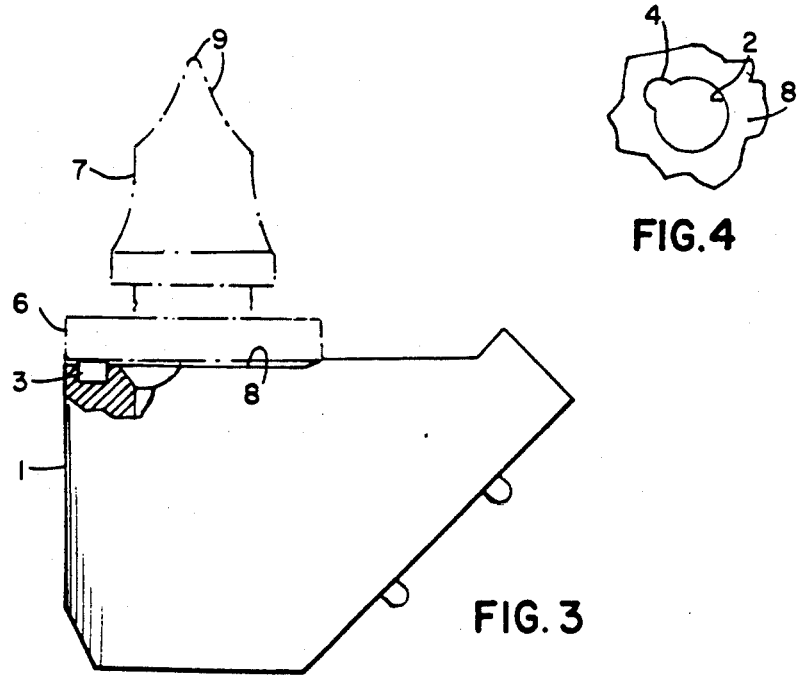
FIG. 4
FIG. 3

CUTTING BIT MOUNT HAVING CARBIDE INSERTS AND METHOD FOR MOUNTING THE SAME

This invention concerns blocks or bit mounts used as tool holders, for example, on road milling machines. An example thereof is shown in U.S. Pat. No. 4,728,153 (incorporated herein by reference) which discloses a cutting bit 4 supported in bit mount 6, which is usually made of steel. Cutting bit 4 also has a flange 24, also sometimes referred to as a shoulder, which is greater in diameter than bore 20 into which cutting bit 4 is inserted. During operation, flange 24 rotatably bears against the forward surface of bit mount 6. Such action shortens the useful life of the steel bit mount. A method of increasing such useful life is to provide carbide inserts on said forward surface for flange 24 to bear against. This invention is concerned with a method of providing such carbide inserts.

In this invention carbide inserts are inserted into holes in the forward surface of the bit mount and are secured therein by brazing. However, during the brazing operation, steam and gases evolved from the flux used in brazing tend to push the carbide inserts out of the holes. I have found that this problem can be solved by means of a small hole next to the insert hole and overlapping therewith. A braze slug is inserted into the small hole. The carbide insert is then forced into the insert hole, the overlapping part of the braze slug creating an interference fit with the carbide insert. The force fit keeps the insert in place during evolution of flux steam and gases. The melting of the braze slug wets the insert; subsequent cooling results in a secure braze of the insert in the bit mount.

In the drawing, FIG. 1 is an exploded view of a bit mount, inserts and slugs prior to brazing. FIG. 2 is a plan view of the bit mount alone. FIG. 3 is an elevational view of the bit mount partially in section to show a brazed insert and showing a cutting bit in phantom. FIG. 4 is an enlarged view showing the slug hole overlapping the insert hole.

A bit mount 1 in accordance with this invention has holes 2 for carbide inserts 3 and holes 4 for braze slugs 5. Holes 4 overlap holes 2 slightly, as shown in FIG. 4. Braze slugs 5 are inserted into holes 4, where they are a tight fit therein. Carbide inserts 3, coated with flux, are then forced into holes 2. The overlapping part of each braze slug 5 causes an interference fit with the carbide insert 3. Bit mount 1 is then heated to melt braze slugs 5 which wet and braze inserts 3 within holes 2.

As shown in FIG. 3, shoulder 6 of cutting bit 7 rotatably bears against forward surface 8 of bit mount 1 if carbide inserts 3 are flush with surface 8 and rotatably bears against carbide inserts 3 if carbide inserts 3 are slightly raised above forward surface 8. Carbide inserts 3 are harder than steel shoulder 6 and prevent significant wear of surface 8. In use, because of the wear of tip 9, cutting bit 7 is replaced before there is significant wear of steel shoulder 6 because of rotatably bearing against carbide inserts 3.

In one example, bit mount 1 had three equally spaced holes 2 on a 1.29" diameter circle. Each hole 2 was 0.209" diameter by 0.195" deep. Each hole 4 was 0.060" diameter by 0.195" deep. The overlap of hole 4 into hole 2 was about 10 to 15 mils. Braze slugs 5 were 0.062" diameter by 0.125" long. Inserts 3 were 199 to 203 mils in diameter by about 190 mils long and were slightly tapered for ease of entry into holes 2. Braze slugs 5 were forced into holes 4 and then inserts 3, coated with flux, were hammered into holes 2. Bit mount 6 was then heated to 1600° F. in a furnace for brazing and was then quenched in oil upon removal therefrom.

I claim:

1. In a bit mount having a forward surface for a shoulder of a cutting bit to rotatably bear against, the method of providing carbide inserts in said forward surface in order to reduce wear of said forward surface, said method comprising the steps of: providing insert holes in said forward surface into which carbide inserts can be inserted; providing smaller holes next to the insert holes, the smaller holes slightly overlapping the insert holes; inserting braze slugs into the smaller holes; forcing carbide inserts into the insert holes so that there is an interference fit between the braze slugs and the carbide inserts; and heating the braze slugs to a temperature at which the braze slugs melt, wet the carbide inserts and secure the carbide inserts in the insert holes by brazing.

2. The method of claim 1 wherein the braze slugs are coated with flux prior to insertion in the smaller holes.

3. The method of claim 1 wherein the carbide inserts are forced into the insert holes so that the carbide inserts are about flush, or slightly elevated above, the forward surface of the bit mount.

4. A bit mount having a forward surface for a shoulder of a cutting bit to rotatably bear against, said forward surface having insert holes therein into which carbide inserts can be inserted, said forward surface also having smaller holes, next to the insert holes, into which braze slugs can be inserted, the smaller holes slightly overlapping the insert holes.

5. The bit mount of claim 4 wherein there are carbide inserts in the insert holes and there are braze slugs in the smaller holes and wherein there is an interference fit between the carbide inserts and the braze slugs.

6. The bit mount of claim 4 wherein there are carbide inserts in the insert holes, the carbide inserts being secured in the insert holes by brazing.

7. The bit mount of claim 6 wherein the carbide inserts are about flush, or slightly elevated above, the forward surface of the bit mount.

* * * * *